Patented Dec. 11, 1934

1,983,672

UNITED STATES PATENT OFFICE 1,983,672

BEESWAX SUBSTITUTES AND METHOD OF PREPARING THE SAME

Jules Labarthe, Jr., and Donald K. Tressler, Pittsburgh, Pa., assignors to The Mathieson Alkali Works, Inc., New York, N. Y., a corporation of Virginia No Drawing. Application January 15, 1930,
Serial No. 421,064

21 Claims. (Cl. 260—116)

This invention relates to new beeswax substitutes and methods of preparing the same. These new beeswax substitutes are prepared directly from hydrocarbons having a high melting point, i. e. a melting point above 60° C., by oxidation with oxygen or air.

The high melting point hydrocarbons which are subjected to oxidation to produce the new beeswax substitutes may be a high melting point paraffin wax derived from petroleum, such as Superla wax which is a high melting mixture of hydrocarbons produced by the Standard Oil Company of Indiana. Or the new beeswax substitutes may be produced from the high melting point wax such as Utahwax, prepared from an ozokerite. The wax prepared from such an ozokerite is a mixture of straight chain and branched chain hydrocarbons. It may advantageously be subjected to a bleaching treatment before being oxidized to produce the beeswax substitutes of this invention. Both of these starting materials have a high melting point, i. e. a melting point above 60° C. and both are practically free from compounds other than hydrocarbons. Superla wax contains higher melting hydrocarbons than are found in ordinary paraffin. It is composed essentially of straight chain hydrocarbons.

On oxidation hydrocarbons yield alcohols, ketones, aldehydes and fatty acids and also fatty acid esters. The new beeswax substitutes are prepared by oxidation of waxes which have an acid value and ester value of substantially zero. The acid value and ester value of the beeswax substitutes produced indicate that both acids and esters are formed by the oxidation and it is probable that the beeswax substitutes contain in addition alcohols and aldehydes and possibly also ketones, all, or most of which, are compounds of high molecular weight.

The new beeswax substitutes are prepared directly from high melting point hydrocarbons by oxidation, i. e. without the addition of foreign materials or the subtraction of any ingredients, although a catalyst or mixture of catalysts is employed to advantage. The catalysts employed may be any one of the catalysts ordinarily employed in similar oxidation reactions, such as the oxides of heavy metals of two or more valences such as nickel, lead, copper, cobalt or manganese, or the metals themselves in finely divided form, or the soaps and resinates of these metals, such as the oleates, stearates, linoleates or linolenates. The soaps are ordinarily to be preferred to the metals or oxides because they dissolve readily in the hydrocarbons. Manganese and manganese compounds such as manganese oleate are particularly desirable because when they are employed as catalysts, products which are light in color can be obtained.

In oxidizing the hydrocarbons, they are ordinarily heated to a temperature of about 120 to 150° C., when oxygen is used as the oxidizing agent. When air is employed at ordinary pressures, a somewhat higher temperature is preferred. A temperature as low as 140° C. may be satisfactorily employed. Oxygen is ordinarily to be preferred to air since a lower temperature may then be employed and the use of the lower temperature causes less decomposition of the hydrocarbon material, and a product of generally improved properties and lighter appearance is produced. The reaction takes place more rapidly at higher temperatures than the temperatures here given but at temperatures above about 180° C. the product is dark and tends to become somewhat sticky. The oxidation can be effected without the use of catalysts, but when a catalyst is employed lower temperatures may be used and the time required for the reaction is reduced, both of which conditions are desirable from the cost standpoint and tend to give products of generally improved properties and appearance. With finely divided metals or metallic oxides as catalysts, the reaction, as a rule, takes place more slowly than when soaps are employed as the catalysts, and a higher temperature may be required for the oxidation.

In carrying out the oxidation, the air or oxygen may be bubbled through the hydrocarbon material and the material may be agitated to advantage to accelerate the rate of oxidation. Any suitable means for effecting intimate contact between the air or oxygen and the melted hydrocarbon may be employed. The oxidizing reaction is continued until a suitable beeswax substitute is produced. Beeswax substitutes with a melting point somewhat higher than the melting point of beeswax may be obtained according to this invention, and substitutes with such higher melting point are to be desired for some purposes since they retain their shape for longer periods than products of lower melting point at elevated temperatures. In general, the higher the ester value of the product the better it can be molded.

We have found that suitable beeswax substitutes can be produced directly by bringing air or oxygen into direct contact with a hydrocarbon material of high melting point. Another method of carrying out the process consists in passing air or oxygen through a series of containers, each of which contains a hydrocarbon material of high melting point. Air or oxygen which has passed through one reaction vessel is more effective as an oxidizing agent in the process of this invention than fresh air or oxygen, and a smaller quantity of such air or oxygen will be required to produce beeswax substitute from any given quantity of high melting hydrocarbons.

Although we do not wish to limit ourselves to any one theory to account for the improved reaction produced by using as the oxidizing gas a gas which has already been used for oxidation, we believe that it is due to the fact that the moisture content of the oxidizing gas is increased in the first vessel and that moist air or oxygen is to be preferred to air or oxygen which contains no moisture.

Two examples of methods of preparing beeswax substitutes directly from high melting point hydrocarbons are given below, but it is to be understood that the invention is illustrated thereby and it is not intended to limit the invention thereto. Although in the two examples given below glass vessels were used, it is not intended to limit the invention to the use of vessels constructed of this material.

The starting material employed in Example 1 may be used in a manner similar to that described in Example 2 and similarly the starting material used in Example 2 may be employed in a manner similar to that described in Example 1. Either air or oxygen may be employed as the oxidizing agent. When air is used the temperature of the reaction will ordinarily be maintained ten or twenty degrees higher than when oxygen is used.

*Example 1.*—500 grams of a mixture of the higher paraffin hydrocarbons melting at 74–76° C. (Superla wax) was mixed with 10 grams of manganese oleate and oxidized in a glass reaction vessel at 130–140° C. by oxygen passed through the hydrocarbons by means of a tube with many small orifices submerged in the hydrocarbons. The oxygen was passed through the hydrocarbons at the rate of approximately one-half a cubic foot per hour. At the end of 144 hours the contents of the vessel had gained in weight about 20 grams. It had an acid value of about 23 and an ester value of approximately 100. In physical properties this product closely resembled beeswax except it melted at a temperature approximately ten degrees above the melting point of true beeswax.

*Example 2.*—Two batches of 1500 grams each of the ozokerite wax ("Utahwax") with a melting point of 73° C. were mixed with but one percent of their weight of manganese oleate and then oxidized simultaneously in two flasks A and B. Dry oxygen at the rate of three-tenths cubic feet per hour was passed into the flask A and brought into intimate contact with the hydrocarbon therein. The oxygen and the vapors coming off from the first flask A were passed through a soda-lime tower and then into flask B. The temperature of each flask was maintained at approximately 120° C., and after oxidation for 288 hours the reaction was discontinued. The product in each flask resembled commercial beeswax and was suitable for use as a beeswax substitute. The acid value of the product in flask A was about 25.8 and its ester value about 50.6. The product in flask B had an acid value of about 46.7 and an ester value of about 56.6.

The beeswax substitutes of this invention may be used alone or mixed with higher melting waxes such as carnauba wax for shoe or leather polishes, floor polishes, furniture polishes, automobile polishes, etc.

We claim:

1. The method of preparing beeswax substitutes directly from aliphatic petroleum hydrocarbons with a melting point above 60° C., which comprises oxidizing the hydrocarbons and continuing the oxidizing reaction until a beeswax substitute having a melting point about 10° higher than beeswax is produced.

2. The method of preparing beeswax substitutes directly from aliphatic petroleum hydrocarbons with a melting point of 60° C. or above, which comprises bringing the hydrocarbons into direct and intimate contact with an oxidizing gas at a temperature of 120° C. or above, and continuing the oxidation until a beeswax substitute having a melting point about 10° higher than beeswax is produced.

3. The method of preparing beeswax substitutes directly from aliphatic petroleum hydrocarbons with a melting point above 60° C., which comprises bringing an oxidizing gas into direct and intimate contact with the hydrocarbons in the presence of a catalyst and continuing the oxidizing reaction until a beeswax substitute having a melting point about 10° higher than beeswax is produced.

4. The method of preparing beeswax substitutes directly from aliphatic petroleum hydrocarbons with a melting point of 60° C. or above, which comprises bringing the hydrocarbons into direct and intimate contact with an oxidizing gas at a temperature of 120° C. or above in the presence of a catalyst, and continuing the oxidation until a beeswax substitute having a melting point about 10° higher than beeswax is produced.

5. The method of preparing beeswax substitutes directly from aliphatic petroleum hydrocarbons with a melting point of 60° C. or above, which comprises bringing the hydrocarbons into direct and intimate contact with oxygen at a temperature of 120° C. or above in the presence of a catalyst, and continuing the oxidation until a beeswax substitute having a melting point about 10° higher than beeswax is produced.

6. The method of preparing beeswax substitutes directly from aliphatic petroleum hydrocarbons with a melting point of 60° C. or above, which comprises bringing the hydrocarbons into direct and intimate contact with an oxidizing gas at a temperature below 180° C. in the presence of a manganese soap as a catalyst, and continuing the oxidation until a beeswax substitute having a melting point about 10° higher than beeswax is produced.

7. The method of preparing beeswax substitutes directly from a paraffin wax of petroleum origin composed essentially of straight chain hydrocarbons and with a melting point above 60° C., which comprises bringing an oxidizing gas into direct and intimate contact with the wax in the presence of a catalyst, and continuing the oxidizing reaction until a beeswax substitute having a melting point about 10° higher than beeswax is produced.

8. The method of preparing beeswax substitutes directly from an ozokerite wax which has a melting point above 60° C., which comprises bringing an oxidizing gas into direct and intimate contact with the hydrocarbons, and continuing the oxidizing reaction until a beeswax substitute having a melting point higher than beeswax, an acid value above 20 and an ester value of 50 or above is produced.

9. The method of preparing beeswax substitutes directly from "Utahwax" which has a melting point above 60° C., which comprises bringing an oxidizing gas into direct and intimate contact with the hydrocarbons in the presence of a catalyst, and continuing the oxidizing reaction until a beeswax substitute having a melting point higher than beeswax, an acid value above 20 and an ester value of 50 or above is produced.

10. The method of preparing beeswax substitutes directly from a wax composed essentially of aliphatic petroleum hydrocarbons, and having a melting point above 60° C., which comprises bringing an oxidizing gas into direct and intimate contact with the hydrocarbons in the presence of a catalyst, and continuing the oxidizing reaction until a beeswax substitute having a melting point about 10° higher than beeswax is produced.

11. The method of preparing beeswax substitutes directly from aliphatic petroleum hydrocarbons with a melting point above 60° C., which comprises bringing a moist oxidizing gas into direct and intimate contact with the hydrocarbons in the presence of a catalyst, and continuing the oxidizing reaction until a beeswax substitute having a melting point about 10° higher than beeswax is produced.

12. The method of preparing beeswax substitutes directly from aliphatic petroleum hydrocarbons with a melting point above 60° C., which comprises providing two or more separate batches of the hydrocarbons and mixing a catalyst therewith, passing an oxidizing gas in an amount in excess of that required to oxidize the batch of hydrocarbons into direct and intimate contact with one batch of the hydrocarbon material, passing the gases, including the oxidizing gas, and vapors coming from this batch into direct and intimate contact with the other batch of hydrocarbon material, and continuing the oxidation of at least one of the batches until a beeswax substitute having a melting point higher than beeswax, an acid value above 20 and an ester value of 50 or above is produced.

13. A beeswax substitute having a melting point higher than beeswax, an acid value above 20 and an ester value of 50 or above, comprising oxidation products prepared by oxidizing aliphatic petroleum hydrocarbons with a melting point of 60° C. or above.

14. A new beeswax substitute consisting of an oxidation product having a melting point about 10° higher than beeswax comprising acids and esters and formed by the oxidation of aliphatic petroleum hydrocarbons with a melting point of 60° C. or above.

15. A beeswax substitute having a melting point higher than beeswax, an acid value above 20 and an ester value of 50 or above prepared directly by the oxidation of a paraffin base of petroleum origin having a melting point of 60° C. or above.

16. A beeswax substitute having a melting point higher than beeswax, an acid value above 20 and an ester value of 50 or above prepared directly by the oxidation of an ozokerite with a melting point of 60° C. or above.

17. A beeswax substitute having a melting point higher than beeswax, an acid value above 20 and an ester value of 50 or above comprising acids and esters prepared by the oxidation of a wax with a melting point of 60° C. or above composed essentially of aliphatic petroleum hydrocarbons.

18. The method of preparing beeswax substitutes directly from aliphatic petroleum hydrocarbons with a melting point of 60° C. or above, which comprises bringing the hydrocarbons into direct and intimate contact with an oxidizing gas at a temperature between 120 and 150° C., and continuing the oxidation until a beeswax substitute having a melting point higher than beeswax, an acid value above 20 and an ester value of 50 or above is produced.

19. The method of preparing beeswax substitutes directly from aliphatic petroleum hydrocarbons with a melting point of 60° C. or above, which comprises bringing the hydrocarbons into direct and intimate contact with an oxidizing gas at substantially atmospheric pressure at a temperature of 120° C. to 150° C. and continuing the oxidation until a beeswax substitute having a melting point higher than beeswax, an acid value above 20 and an ester value of 50 or above is produced.

20. A beeswax substitute prepared from aliphatic petroleum hydrocarbons having a melting point of 60° C. or above consisting of an oxidation product containing acids and esters having a melting point about 10° higher than beeswax.

21. A beeswax substitute prepared from aliphatic petroleum hydrocarbons having a melting point of 60° C. or above consisting of an oxidation product containing acids and esters characterized in that it has a melting point higher than beeswax, an acid value above 20 and an ester value of 50 or above.

JULES LABARTHE, Jr.
DONALD K. TRESSLER.